United States Patent Office 3,714,405
Patented Jan. 30, 1973

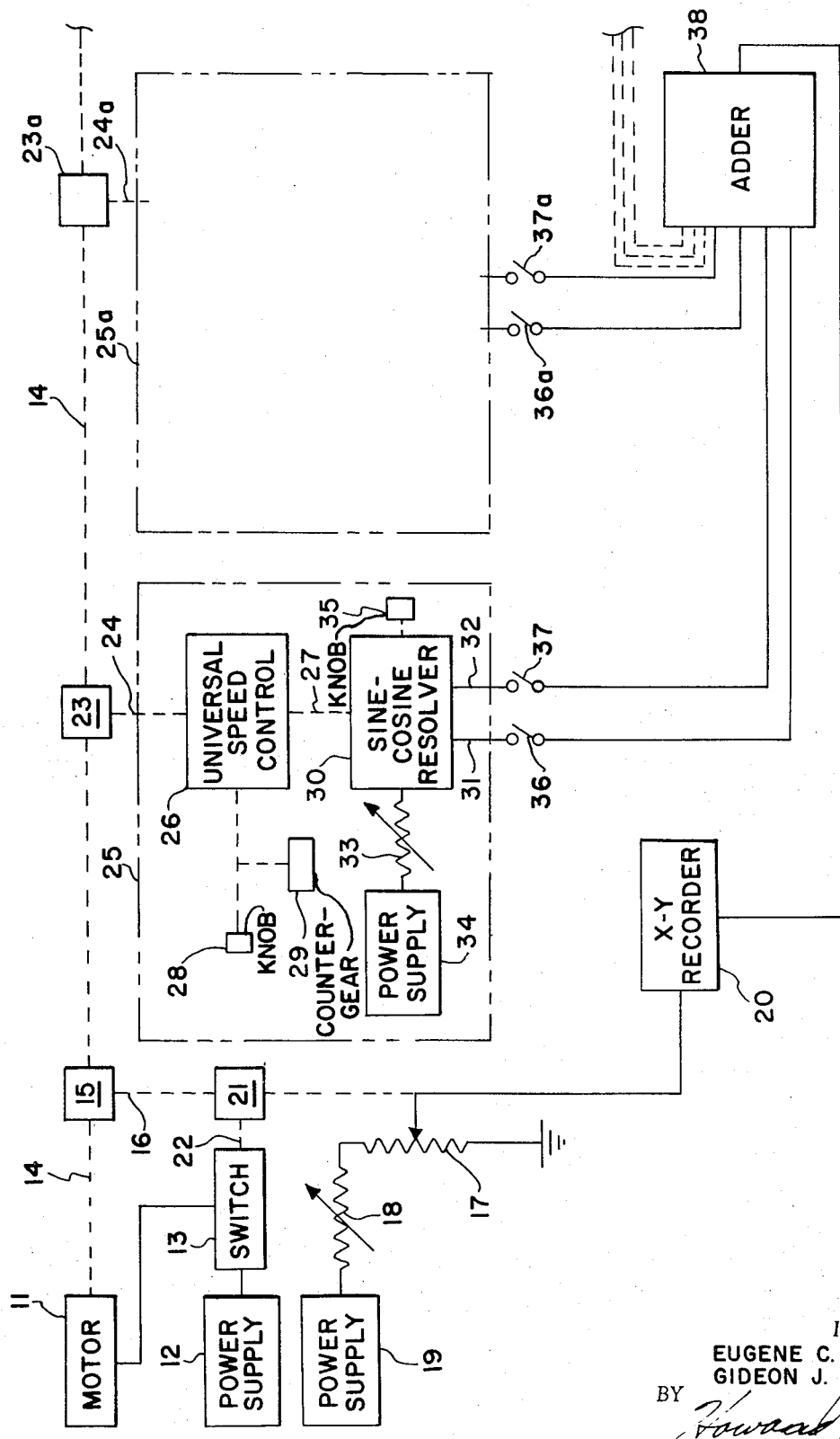

3,714,405
FUNCTION GENERATOR FOR SYNTHESIZING COMPLEX VIBRATION MODE PATTERNS
Eugene C. Naumann and Gideon J. Hagood, Jr., Newport News, Va., assignors to the United States of America as represented by the Administrator of the National Aeronautics and Space Administration
Filed May 26, 1971, Ser. No. 147,103
Int. Cl. G06g 7/22, 7/26
U.S. Cl. 235—197        9 Claims

ABSTRACT OF THE DISCLOSURE

A simple highly flexible device for synthesizing complex vibration mode patterns. These mode patterns can be used to identify vibration mode data. This device sums selected sine and cosine functions and then plots the sum against a linear function.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to function generators and more specifically concerns a device for generating complex vibration mode patterns that can be used to identify vibration mode data.

Vibration mode data is usually a complex wave form made up of several sine and cosine functions. To understand the significance of any vibration mode data, it is necessary to identify the sine and cosine functions that make up the data. In the past hand calculators and general purpose digital or analog computers have been used for this purpose. However, both are costly and time-consuming, resulting in time delays. It is therefore the primary purpose of this invention to provide an inexpensive function generator that will readily identify vibration mode data.

SUMMARY OF THE INVENTION

The invention includes a motor with its shaft driving a linear module which produces an electrical output that is a linear function of the shaft rotation; and with its shaft driving a plurality of trigonometric modules with each module producing an electrical output that is a sine function and an electrical output that is a cosine function of the shaft rotation. The linear module includes means for varying the amplitude of its electrical output; and each of the trigonometric modules includes means for varying the amplitude, frequency and phase of each of its two electrical outputs. Switch means are provided for applying selected ones of the outputs from the trigonometric modules to an adder. The output from the adder and the output from the linear module are applied to an X–Y recorder. By manipulating the varying and switch means, vibration mode data can be simulated on the X–Y recorder. When any vibration mode data is simulated on the X–Y recorder the positions of the switch and varying means identify the data.

BRIEF DESCRIPTION OF THE DRAWING

The sole figure in the drawing is a combination schematic block diagram of the invention.

DETAILED DESCRIPTION OF THE INVENTION

Turning now to the embodiment of the invention selected for illustration in the drawing, the number 11 designates a motor that is powered by a power supply 12 through a switch 13. The output shaft 14 of motor 11 is connected through a gear 15 to a shaft 16 which controls the position of the slider of a potentiometer 17. Potentiometer 17 has a voltage applied to it through a variable resistor 18 from a power supply 19. The slider of potentiometer 17 is electrically connected to an X–Y recorder 20. Shaft 16 is connected through a gear 21 to shaft 22 which controls switch 13. Switch 13 is closed to start motor 11. After shaft 14 rotates a certain predetermined number of revolutions, shaft 22 opens switch 13. This can be done in an obvious manner by use of a cam on shaft 22 and the gear ratio of gear 21. The reason for opening switch 13 is to limit the travel of the slider of potentiometer 17. The voltage at any given time on the slider of potentiometer 17 is proportional to the angle through which shaft 14 has rotated. The amplitude of this voltage can be varied by means of variable resistor 18. This voltage at the output of potentiometer 17 is a scaled representation of a physical property of the model from which the vibration mode data is taken; for example, it is a linear display of the model circumference.

The output shaft 14 of motor 11 is also connected through a plurality of gears 23, 23a . . . to shafts 24, 24a . . . , respectively. Shafts 24, 24a . . . are connected to trigonometric modules 25, 25a . . . , respectively. As is apparent, as many of the trigonometric modules as desired can be used. All of the trigonometric modules are identical; hence, the details of only module 25 will be described in detail.

Shaft 24 is connected to a universal speed control 26 for the purpose of changing the frequency of revolution of shaft 24 to a different frequency of revolution of a shaft 27. Speed control 26 is continuously variable over a large range of input rotations of shaft 24 to output rotations of shaft 27, and therefore eliminates the need for many sets of gears having fixed ratios of teeth which would require large amounts of time to change. The desired number of output rotations of shaft 24 per input rotation of shaft 24 is set by means of a knob 28 which has attached a counter-gear arrangement 29 for displaying this ratio. Shaft 27 is connected to a sine-cosine resolver 30 which produces an electrical signal on its output 31 that is proportional to the sine of the angle of rotation of shaft 27, and which produces an electrical signal on its output 32 that is proportional to the cosine of the angle of rotation of shaft 27. A voltage is applied through a variable resistor 33 to sine-cosine resolver 30 from a power supply 34. The phase of the outputs 31 and 32 can be varied by means of a knob 35. Hence, the frequency, amplitude and phase of the outputs 31 and 32 can be readily varied by means of knob 28, variable resistor 33 and knob 35, respectively. Outputs 31 and 32 can be selectively applied to an adder 38 by means of switches 36 and 37, respectively. The output of adder 38 is applied to X–Y recorder 20.

In the operation of this invention, the vibration mode data that is to be identified is viewed by the operator. From this viewing he determines what the predominant trigonometric wave is and sets it into the first trigonometric module 25 by means of switches 36 and 37, variable resistor 33 and knobs 28 and 35. He then makes a recording of it on X–Y recorder 20 by running motor 11 through the cycle determined by limiting switch 13. He then adds another trigonometric wave to the first wave by means of the second trigonometric module 15a and view the composite wave. He continues this process until the vibration mode data is reproduced on X–Y recorder 20. At this time the settings of all the trigonometric modules and the positions of switches 36, 36a . . . , 37, 37a . . . identifies the vibration mode data.

For a specific example, assume that the vibration mode data coincides with the trigonometric function $y = 2 \sin \theta + \cos(2\theta + 15°) + \sin(5\theta - 10°)$. The operator can identify this function by using only three of the trigonometric modules 25. However, the vibration mode data is in many instances more complex in which case a larger number of trigonometric modules 25 are required to identify the trigonometric functions that represent the data.

The advantages of this invention is that it provides an inexpensive, easy-to-operate, flexible means for identifying vibration mode data in a short period of time.

It is to be understood that the form of the invention herewith shown and described is to be taken as a preferred embodiment. Various changes may be made without departing from the spirit and scope of the invention as described in the subjoined claims. The device described is for application to rotationally symmetric bodies, however, by varying the mechanism of the voltage controls other geometric shapes can be represented. For example, if potentiometer 17 is driven by a gear with offset shaft location, the result is a signal which varies as the circumference of an ellipse. The device is applicable to any body shape for which a resistance change will describe the desired quantity. Functions such as linear, elliptic, ramp, trigonometric, etc., are readily obtained. Variable gain amplifiers could be used to vary the outputs of the modules. Also recorder 20 could be a polar coordinate recorder instead of an X–Y recorder. This could be accomplished by substituting a sine-cosine resolver for potentiometer 17.

1. A function generator comprising:
    a motor including a shaft;
    means connected to said shaft for generating a first electrical signal that is a linear function of the rotation of said shaft;
    means connected to said shaft for generating a plurality of second electrical signals that are trigonometric functions of the rotation of said shaft;
    means for varying the amplitude of each of said second electrical signals;
    means for varying the frequency of each of said second electrical signals;
    means for varying the phase of each of said second electrical signals;
    means for adding selected ones of said second electrical signals to produce a third electrical signal; and
    means for recording said first electrical signal versus said third electrical signal.

2. A function generator according to claim 1 wherein said means for generating a first electrical signal is a potentiometer.

3. A function generator according to claim 1 wherein said means for generating a plurality of second electrical signals includes a plurality of sine-cosine resolvers with each generating an electrical signal that is a sine function of the rotation of said shaft and an electrical signal that is a cosine function of the rotation of said shaft.

4. A function generator according to claim 3 wherein said means for varying the frequency of said second electrical signals is means connected between said shaft and the input shafts of said sine-cosine resolvers to vary the ratio of said shaft rotations to the rotations of said input shafts of said sine-cosine resolvers.

5. A function generator according to claim 4 wherein said means connected between said shaft and the input shafts of said sine-cosine resolvers are universal speed controls.

6. A function generator according to claim 3 wherein said means for varying the amplitudes said second electrical singals includes means for varying the amplitude of the supply voltage applied to each of said sine-cosine resolvers.

7. A function generator according to claim 3 wherein said means for varying the phase of each of said second electrical signals includes means associated with each of said sine-cosine resolvers for varying the phase between its shaft input and its electrical outputs.

8. A function generator according to claim 3 wherein said means for adding selected ones of said second electrical signals includes an adder and switch means for selectively applying any combination of said second electrical signals to said adder.

9. A function generator according to claim 3 wherein said recording means is an X–Y recorder.

References Cited

UNITED STATES PATENTS

| | | | |
|---|---|---|---|
| 2,894,685 | 7/1959 | Spencer et al. | 235—197 |
| 2,965,299 | 12/1960 | Gordon | 235—186 |
| 2,978,177 | 4/1961 | Newell et al. | 235—186 |
| 2,989,239 | 6/1961 | Bailey | 235—186 |
| 3,604,248 | 9/1971 | Altmann et al. | 73—66 |

JOSEPH F. RUGGIERO, Primary Examiner

U.S. Cl. X.R.

73—67.2; 235—189